US012804717B2

(12) United States Patent
Li

(10) Patent No.: US 12,804,717 B2
(45) Date of Patent: Nov. 17, 2026

(54) DATA TRANSMISSION METHOD AND APPARATUS, COMPUTER READABLE STORAGE MEDIUM AND ELECTRONIC APPARATUS

(71) Applicant: ZTE Corporation, Shenzhen (CN)

(72) Inventor: Yan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 348 days.

(21) Appl. No.: 18/704,176

(22) PCT Filed: Apr. 14, 2022

(86) PCT No.: PCT/CN2022/086808
§ 371 (c)(1),
(2) Date: Apr. 24, 2024

(87) PCT Pub. No.: WO2023/071068
PCT Pub. Date: May 4, 2023

(65) Prior Publication Data
US 2024/0422821 A1 Dec. 19, 2024

(30) Foreign Application Priority Data
Oct. 25, 2021 (CN) ......................... 202111242438.7

(51) Int. Cl.
*H04W 74/0816* (2024.01)
*H04W 28/02* (2009.01)
*H04W 74/08* (2009.01)

(52) U.S. Cl.
CPC ... *H04W 74/0816* (2013.01); *H04W 28/0278* (2013.01); *H04W 74/0866* (2013.01)

(58) Field of Classification Search
CPC ......... H04W 74/0816; H04W 74/0866; H04W 74/04; H04W 74/002; H04W 28/0278; H04W 84/12
(Continued)

(56) References Cited

U.S. PATENT DOCUMENTS 8,600,336 B2 12/2013 Meylan et al.
11,470,629 B1 * 10/2022 Smith ................. H04W 72/535
(Continued)

FOREIGN PATENT DOCUMENTS

CN 107852742 A 3/2018
CN 111918406 A 11/2020
(Continued)

OTHER PUBLICATIONS

Japanese Office Action; Application No. 2024524669; Date of mailing: May 21, 2025; 20 pages.
(Continued)

*Primary Examiner* — Ricardo H Castaneyra
(74) *Attorney, Agent, or Firm* — CANTOR COLBURN LLP

(57) ABSTRACT

A data transmission method and apparatus, a computer readable storage medium and an electronic apparatus are provided. The data transmission method includes: entering, by an AP, an enhanced HCCA mode when determining that data transmission under an EDCA mode does not satisfy a low delay requirement, wherein under the enhanced HCCA mode, the AP broadcasts a target frame to all STAs comprised in a target BSS, so as to notify all the STAs that the AP needs to occupy a first TXOP for data transmission; after the first TXOP ends, in a case where it is determined that the AP has not completed the data transmission, repeating, by the AP, the operation of broadcasting the target frame to all the STAs so as to notify all the STAs that the AP needs to
(Continued)

occupy other TXOP for the data transmission, until the AP completes the data transmission.

17 Claims, 4 Drawing Sheets

(58) Field of Classification Search
USPC .... 370/329, 310, 445, 235, 230, 252, 395.4, 370/338, 346
See application file for complete search history.

(56) References Cited

U.S. PATENT DOCUMENTS

| | | | | |
|---|---|---|---|---|
| 2002/0093929 | A1 * | 7/2002 | Mangold | H04W 74/04 370/336 |
| 2006/0268716 | A1 * | 11/2006 | Wijting | H04L 47/2433 370/408 |
| 2008/0095124 | A1 * | 4/2008 | Ramos | H04W 28/02 370/336 |
| 2008/0171550 | A1 * | 7/2008 | Zhao | H04W 74/02 455/445 |
| 2013/0100952 | A1 * | 4/2013 | Hart | H04L 12/1868 370/432 |
| 2018/0139699 | A1 * | 5/2018 | Choi | H04W 52/0216 |

FOREIGN PATENT DOCUMENTS

| | | | |
|---|---|---|---|
| CN | 112492700 | A | 3/2021 |
| CN | 112752350 | A | 5/2021 |
| EP | 2127235 | B1 | 7/2011 |
| JP | 2003284134 | A | 10/2003 |
| JP | 2007184771 | A | 7/2007 |
| JP | 2007522692 | A | 8/2007 |
| JP | 2008514145 | A | 5/2008 |
| JP | 2008172763 | A | 7/2008 |
| JP | 2019532529 | A | 11/2019 |
| JP | 2019536334 | A | 12/2019 |
| WO | 2005094009 | A1 | 10/2005 |
| WO | 2013024529 | A1 | 2/2013 |
| WO | 2020222584 | A1 | 11/2020 |

OTHER PUBLICATIONS

Mohammed A. Al-Maqri et al., “Review on QoS provisioning approaches for supporting video traffic in IEEE802.11e: Challenges and issues.” IEEE Access 6 (2018): 55202-55219.

European Search Report for corresponding application EP 2288 4984; Mail date Dec. 10, 2024.

Huawei, HiSilicon, “NR frame structure on unlicensed bands”, 3GPP TSG RAN WG1 Meeting #93, Busan, Korea, May 21-May 25, 2018, R1-1805917.

International Search Report for corresponding application PCT/CN2022/086808 filed Apr. 14, 2022; Report dated Jun. 6, 2022.

* cited by examiner

DATA TRANSMISSION METHOD AND APPARATUS, COMPUTER READABLE STORAGE MEDIUM AND ELECTRONIC APPARATUS

CROSS-REFERENCE TO RELATED APPLICATION

The present disclosure is a National Stage Filing of the PCT International Application No. PCT/CN2022/086808 filed on Apr. 14, 2022, which claims priority to Chinese Patent Application No. 202111242438.7 filed on Oct. 25, 2021, the disclosure of which is incorporated herein by reference in its entirety.

TECHNICAL FIELD

Embodiments of the present disclosure relate to the field of communications, and in particular, to a data transmission method and apparatus, a computer readable storage medium and an electronic apparatus.

BACKGROUND

Enhanced Distributed Channel Access (EDCA) under random channel access mode is unable to provide controllable guarantees for transmission delay in complex multi-user transmission scenarios. When an Access Point (AP) is not able to complete low delay data transmission for multiple users within a single Transmission Opportunity (TXOP) acquired by the AP, due to the random access nature of the random channel access mode of the EDCA, the timing that the AP acquires a TXOP again for completing the multi-user transmission is uncontrollable, which may result in the inability to effectively guarantee the completion of low delay data transmission within the specified delay requirements.

SUMMARY

According to the embodiments of the present disclosure, provided is a data transmission method, including: entering, by an Access Point (AP), an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) included in a target Base Station Subsystem (BSS), so as to notify all the STAs that the AP needs to occupy a first Transmission Opportunity (TXOP) for data transmission; after the first TXOP ends, in a case where it is determined that the AP has not completed the data transmission, repeating, by the AP, the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, entering, by the AP, a Contend Period (CP) of data transmission.

According to the embodiments of the present disclosure, provided is a data transmission apparatus, which is provided in an Access Point (AP) and includes: a broadcasting module, configured to enter an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) included in a target Base Station Subsystem (BSS), so as to notify all the STAs that the AP needs to occupy a first Transmission Opportunity (TXOP) for data transmission; and an execution module, configured to, after the first TXOP ends, in a case where it is determined that the AP has not completed the data transmission, control the AP to repeat the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, control the AP to enter a Contend Period (CP) of data transmission.

According to the embodiments of the present disclosure, provided is a computer readable storage medium. The computer readable storage medium stores a computer program, and the computer program, when being executed by a processor, causes the processor to implement the operations in the foregoing data transmission method.

According to the embodiments of the present disclosure, provided is an electronic apparatus, including a memory and a processor, wherein the memory stores a computer program, and the processor is configured to execute the computer program to implement the operations in the foregoing data transmission method.

BRIEF DESCRIPTION OF THE DRAWINGS

The drawings described herein are intended to provide a further understanding of the technical solutions of the present disclosure, and form a part of the present disclosure. The exemplary embodiments of the present disclosure and the descriptions thereof are intended to explain the technical solutions of the present disclosure, and do not form improper limits to the technical solutions of the present disclosure. In the drawings.

DETAILED DESCRIPTION

In order to make persons having ordinary skill in the art better understand the solutions of the present disclosure, the following clearly and completely describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by persons having ordinary skill in the art based on the embodiments of the present disclosure without creative efforts shall belong to the scope of protection of the present disclosure.

It should be noted that, terms such as "first" and "second" in the specification, claims, and accompanying drawings of the present disclosure are used to distinguish similar objects, but do not limit a specific sequence or order. It is to be understood that the terms so used are interchangeable under appropriate circumstances such that the embodiments of the present disclosure described herein may be implemented otherwise than in the order illustrated or described herein. In addition, the terms "include" and "have", and any variations thereof, are intended to cover a non-exclusive inclusion, for example, a process, method, system, product, or apparatus that includes a series of operations or units is not limited to including only those operations or units that are expressly listed, but may include other operations or units that are not expressly listed or inherent to such process, method, system, product, or apparatus.

Figure 1:
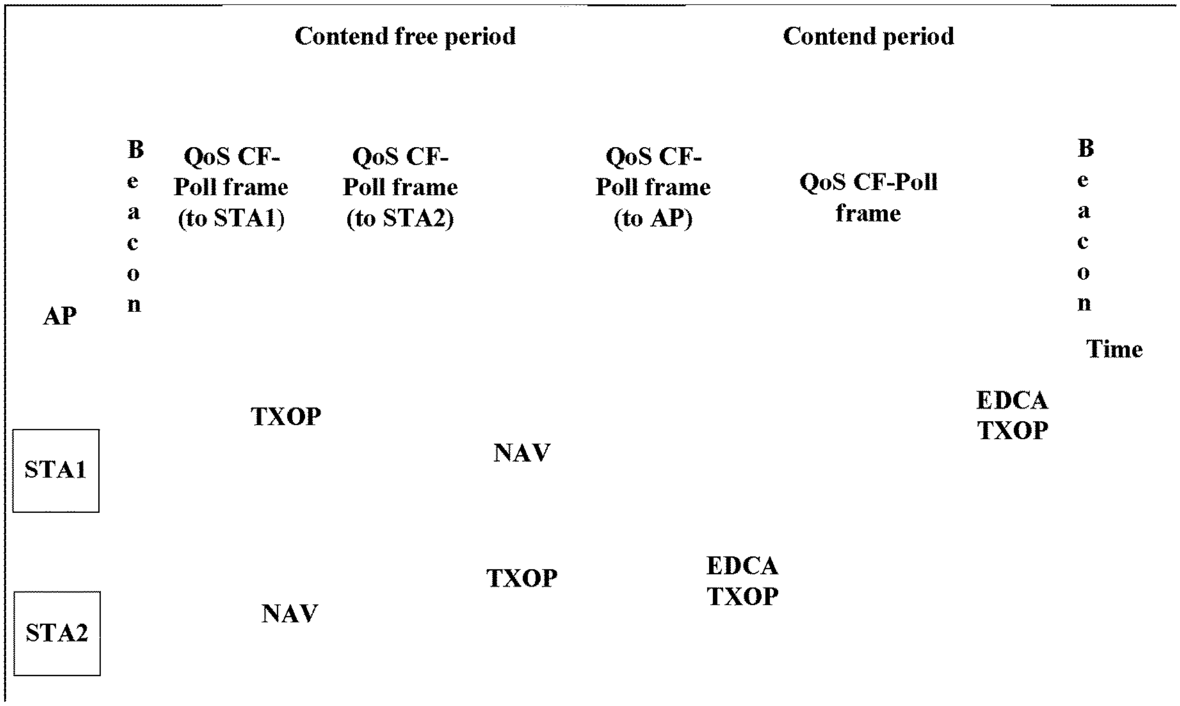
FIG. 1 is a schematic diagram of a Hybrid Coordination Function Controlled Channel Access (HCCA) mode according to the embodiments of the present disclosure.

A Hybrid Coordination Function Controlled Channel Access (HCCA) mode is divided into a Contend Free Period (CFP) and a Contend Period (CP), wherein the CP is similar to the EDCA, and the CFP is a period in which an AP sends a unicast QoS CF-Poll (Contend Free Poll) frame so as to specify each STA to conduct transmission. The time of a TXOP specified for a certain STA is determined by the AP and is only used for the transmission corresponding to a Single User (SU). FIG. 1 is a schematic diagram of an HCCA mode according to the embodiments of the present disclosure, as shown in FIG. 1:

1) At the start of the contend free period: the AP consecutively allocates TXOPs to various STAs and the AP itself for transmission (for simplicity, FIG. 1 does not show the TXOP allocated to the AP itself), and other devices need to set their own Network Allocation Vector (NAV) in the TXOPs occupied by the AP or the STAs and cannot actively send data.
2) At the end of the contend free period: when the AP completes the polling and prepares to end the CFP, the AP actively sends a QoS CF-Poll frame, wherein an RA address in the QoS CF-Poll frame is set to the AP itself, and a Duration/ID field is set to 0; after receiving the QoS CF-Poll frame, all the STAs set their NAV to 0 and enter the EDCA mode to start contending for the TXOP.
3) In the contend period: under the EDCA mode, after preempting the TXOP, the AP may also perform polling transmission in a contend free period mode.

However, the described functions are not introduced in the multi-user transmission of the 802.11AX network, and the reasons are as follows. In a multi-user transmission scenario in a dense and focused environment of the 802.11AX network, when there are too many users, the polling scheduling of all the STAs cannot be completed in one beacon period under the HCCA mode. As the number of users increases, the overhead of scheduling and processing of the users at the AP increases significantly. Hereinafter, the embodiments of the present disclosure will be described.

Figure 2:
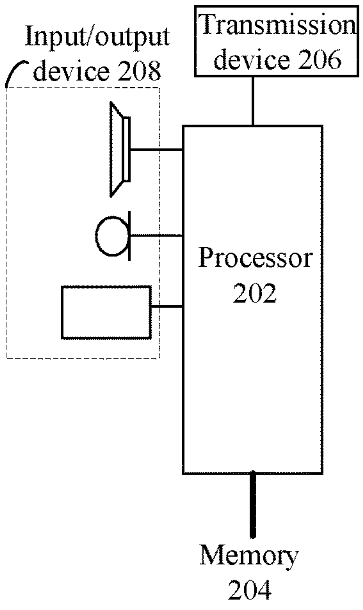
FIG. 2 is a block diagram of a hardware structure of a mobile terminal running the data transmission method according to the embodiments of the present disclosure.

The data transmission method provided in the embodiments of the present disclosure may be executed in a mobile terminal, a computer terminal, or a similar computing apparatus. By taking that the data transmission method provided by the embodiments of the present disclosure is executed on a mobile terminal as an example, FIG. 2 is a block diagram of a hardware structure of a mobile terminal running the data transmission method according to the embodiments of the present disclosure. As shown in FIG. 2, the mobile terminal may include one or more processors 202 (only one is shown in FIG. 2) (each processor 202 may include but are not limited to a processing apparatus such as a microprocessor (e.g., Micro Controller Unit (MCU)) or a programmable logic device (e.g., Field Programmable Gate Array (FPGA)) and a memory 204 for storing data. In some embodiments, the mobile terminal may further include a transmission device 206 for a communication function and an input/output device 208. A person having ordinary skill in the art may understand that the structure shown in FIG. 2 is merely exemplary, which does not limit the structure of the foregoing mobile terminal. For example, the mobile terminal may include more or fewer components than shown in FIG. 2, or have a different configuration from that shown in FIG. 2.

The memory 204 may be configured to store a computer program, for example, a software program and a module of application software, such as a computer program corresponding to the data transmission method in the embodiments of the present disclosure. The one or more processors 202 execute various function applications and data processing by running the computer program stored in the memory 204, thereby implementing the foregoing method. The memory 204 may include high-speed random access memory, and may also include non-volatile memory, such as one or more magnetic storage devices, flash memory, or other non-volatile solid-state memory. In some embodiments, the memory 204 may further include a memory that is remotely located with respect to the one or more processors 202, and the remote memory may be connected to the mobile terminal over a network. Examples of such network include, but are not limited to, the Internet, an intranet, a local area network, a mobile communication network, and combinations thereof.

The transmission device 206 is configured to receive or transmit data via a network. Specific examples of the described network may include a wireless network provided by a communication provider of the mobile terminal. In some embodiments, the transmission device 206 may include a Network Interface Controller (NIC) that may be coupled to other network devices via a base station to communicate with the Internet. In some embodiments, the transmission device 206 may be a Radio Frequency (RF) module configured to wirelessly communicate with the Internet.

Figure 3:
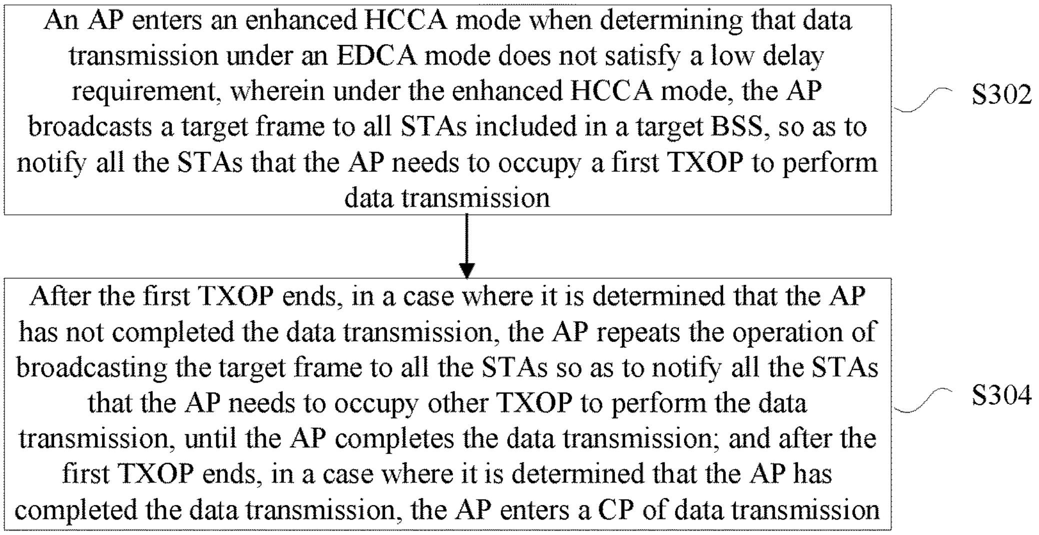
FIG. 3 is a flowchart of a data transmission method according to the embodiments of the present disclosure.

A data transmission method is provided in the embodiments of the present disclosure. FIG. 3 is a flowchart of a data transmission method according to the embodiments of the present disclosure. As shown in FIG. 3, the data transmission method includes the following operations S302 and S304.

At operation S302, an AP enters an enhanced HCCA mode when determining that data transmission under an EDCA mode does not satisfy a low delay requirement, wherein under the enhanced HCCA mode, the AP broadcasts a target frame to all STAs included in a target BSS, so as to notify all the STAs that the AP needs to occupy a first TXOP for data transmission.

At operation S304, after the first TXOP ends, in a case where it is determined that the AP has not completed the data transmission, the AP repeats the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, the AP enters a CP of data transmission.

By means of the described operations, the AP enters the enhanced HCCA mode when determining that data transmission under the EDCA mode does not satisfy the low delay requirement, under the enhanced HCCA mode, the AP broadcasts a target frame to all STAs included in a target BSS, so as to notify all the STAs that the AP needs to occupy a first TXOP for data transmission; and after the first TXOP ends, in a case where it is determined that the AP has not completed the data transmission, the AP repeats the operation of broadcasting the target frame to all the STAs so as to notify all the STAs that the AP needs to occupy other TXOP for the data transmission, until the AP completes the data transmission. The AP repeatedly broadcasts the target frame to all the STAs, so that the AP may acquire TXOPs consecutively and repeatedly for the data transmission, thereby ensuring the requirement of a low delay user for the transmission delay. Therefore, the effect of improving the data transmission efficiency may be achieved.

The described operations may be executed by an access point, for example, an access point in an 802.11AX network. Alternatively, the described operations may also be, but are not limited to be, executed by other processing devices or processing units with similar processing capabilities. The following description takes the access point executing the foregoing operations as an example (which is only an exemplary description, and in actual operations, other devices or modules may also execute the foregoing operations).

In the described operations, the AP enters the enhanced HCCA mode when determining that data transmission under the EDCA mode does not satisfy the low delay requirement. For example, under the EDCA mode, when an AP is not able to complete low delay data transmission for multiple users within a single TXOP acquired by the AP, due to the random access nature of the random channel access mode of the EDCA, the timing that the AP acquires a TXOP again for completing the multi-user transmission is uncontrollable, which may result in the inability to effectively guarantee the completion of low delay data transmission within the specified delay requirements. After entering the enhanced HCCA mode, the AP broadcasts a target frame to all STAs included in a target BSS, for example, during a contend free period of the enhanced HCCA mode, the AP notifies all the STAs in the BSS via a modified QoS CF-Poll frame, so as to notify all the STAs that the AP needs to occupy a first TXOP for data transmission. After the first TXOP ends, in a case where it is determined that the AP has not completed the data transmission, the AP will repeatedly execute the operation of broadcasting the target frame to all the STAs, so as to notify all the STAs that the AP needs to occupy other TXOP for data transmission, until the AP completes the data transmission, i.e., the AP may use the modified QoS CF-Poll frame for multiple times so as to realize TXOP occupation for multiple times. After the first TXOP ends, and when it is determined that the AP has completed the data transmission, the AP may enter the CP of data transmission. By means of the embodiments of the present disclosure, the purpose of consecutively acquiring TXOP for data transmission multiple times may be achieved, thereby achieving the effect of ensuring the controllability of the delay of multi-user transmission.

In some embodiments, the data transmission method may further include: before the AP broadcasts the target frame to all the STAs included in the target BSS, the AP determines that the data transmission under the EDCA mode does not satisfy the low delay requirement in a following manner: the AP determines that uplink data transmission does not satisfy the low delay requirement, or the AP determines that downlink data transmission does not satisfy the low delay requirement. That is, the AP may determine that the data transmission under the EDCA mode does not satisfy the low delay requirement by determining that the uplink data transmission does not satisfy the low delay requirement or determining that the downlink data transmission does not satisfy the low delay requirement. By means of the described embodiments, the purpose of determining whether data transmission under the EDCA mode satisfies the low delay requirement may be achieved.

In some embodiments, the operation that the AP determines that the uplink data transmission does not satisfy the low delay requirement includes: the AP acquires a first Buffer Status Report (BSR) frame sent by a first STA included in all the STAs; and when it is determined that the first BSR frame includes a target field and a value of the target field is equal to a first value, the AP determines that the uplink data transmission does not satisfy the low delay requirement. Namely, the AP may acquire a first BSR frame sent by an STA and determine whether uplink data transmission satisfies the low delay requirement according to whether a value of a target field included in the first BSR frame is equal to a first value. For example, a target field is newly added into a BSR control field, and when the value of the target field is 1 or 0 or another value, it is determined that the uplink data transmission does not satisfy the low delay requirement. By means of the described implementation, the purpose of determining whether the uplink data transmission satisfies the low delay requirement according to the value of the newly added target field in the BSR frame may be achieved.

In some embodiments, the operation that the AP determines that the uplink data transmission does not satisfy the low delay requirement includes performing the following operations in a single evaluation period: the AP records an amount of uplink low delay transmission data that is completed by a second STA included in all the STAs when Uplink Multi-User (UL MU) data transmission is triggered within each TXOP; and the AP determines that the uplink data transmission does not satisfy the low delay requirement when a total amount of the uplink low delay transmission data that is completed by the second STA within a predetermined number of consecutive TXOPs is less than an amount of buffered low delay data reported by the second STA to the AP for the first time. In the described embodiment, in a single evaluation period, the AP records the amount of uplink low delay transmission data completed by an STA when UL MU data transmission is triggered within each TXOP time period (for example, UL-OFDMA and UL-MU MIMO); the AP then determines the total amount of uplink low delay transmission data completed by the STA within a predetermined number of consecutive TXOPs, where the predetermined number may be N (for example, 3, 5 or other values); and when it is determined that the total amount of the uplink low delay transmission data completed by the STA is less than the amount of buffered low delay data reported by the STA to the AP for the first time, it may be determined that the uplink data transmission does not satisfy the low delay requirement. In practical applications, the AP may collect low delay information in advance, for example, the STA may notify, in an explicit manner, the AP of buffered low delay data information, for example, transmission time M (for example, in milliseconds) required by the low delay data and a data size. The AP may buffer low delay data information to be transmitted to each STA in a transmission queue. By means of the described implementation, the purpose of determining whether the uplink data transmission satisfies the low delay requirement by evaluating an amount of uplink low delay transmission data in a single evaluation period may be achieved.

In some embodiments, the operation that the AP determines that the uplink data transmission does not satisfy the low delay requirement includes: the AP determines that the uplink data transmission does not satisfy the low delay requirement when the AP determines that the uplink data transmission does not satisfy the low delay requirement in multiple consecutive evaluation periods. In the foregoing implementation, when the AP determines that the uplink data transmission does not satisfy the low delay requirement in a plurality of consecutive evaluation periods, for example, in a case where it is determined that the uplink data transmission does not satisfy the low delay requirement in three or five or other number of consecutive evaluation periods, it may be determined that the consecutive data transmission does not satisfy the low delay requirement. In practical applications, when it is determined that the uplink data transmission does not satisfy the low delay requirement in the single evaluation period, it may be determined that the burst data transmission does not satisfy the low delay requirement; when it is determined that the uplink data transmission does not satisfy the low delay requirement in multiple consecutive evaluation periods, it may be determined that the consecutive data transmission does not satisfy the low delay requirement. By adopting the solution, scenarios in which the burst data transmission does not satisfy the low delay requirement can be excluded. By means of the embodiments, the purpose of improving the accuracy of determining whether the data transmission satisfies the low delay requirement may be achieved.

In some embodiments, the operation that the AP determines that the downlink data transmission does not satisfy the low delay requirement includes performing the following operations in a single evaluation period: the AP records an amount of downlink low delay transmission data that is completed by the AP when Downlink Multi-User (DL MU) data transmission is triggered within each TXOP; and the AP determines that the downlink data transmission does not satisfy the low delay requirement when a total amount of the downlink low delay transmission data that is completed by the AP within a predetermined number of consecutive TXOPs is less than an amount of downlink low delay data buffered by the AP for the first time. In the described embodiment, in a single evaluation period, the AP records the amount of downlink low delay transmission data that is completed by the AP when DL MU data transmission is triggered (for example, DL-OFDMA and DL-MU MIMO) within each TXOP; the AP then determines the total amount of downlink low delay transmission data completed by the AP in a predetermined number of consecutive TXOPs, in which the predetermined number may be N (for example, 3, 5 or other value); and when it is determined that the total amount of downlink low delay transmission data completed by the AP is less than the amount of downlink low delay data buffered by the AP for the first time, it may be determined that the downlink data transmission does not satisfy the low delay requirement. In practical applications, an AP may collect low delay information in advance, for example, the STA may notify, in an explicit manner, the AP of low delay data information buffered, for example, transmission time M (for example, in milliseconds) required by the low delay data and a data size, and low delay data information to be transmitted to each STA is buffered in a transmission queue at the AP. By means of the described embodiments, the purpose of determining whether the downlink data transmission satisfies the low delay requirement by means of the evaluation of the amount of data transmitted with a low delay in a single evaluation period may be achieved.

In some embodiments, the operation that the AP determines that the downlink data transmission does not satisfy the low delay requirement includes: the AP determines that the downlink data transmission does not satisfy the low delay requirement when the AP determines that the downlink data transmission does not satisfy the low delay requirement in multiple consecutive evaluation periods. In the foregoing embodiment, when the AP determines that the downlink data transmission does not satisfy the low delay requirement in a plurality of consecutive evaluation periods, for example, in a case where it is determined that the downlink data transmission does not satisfy the low delay requirement in three or five or other number of consecutive evaluation periods, it may be determined that the consecutive data transmission does not satisfy the low delay requirement. In practical applications, when it is determined that the downlink data transmission does not satisfy the low delay requirement in the single evaluation period, it may be determined that the burst data transmission does not satisfy the low delay requirement; and when it is determined that the downlink data transmission does not satisfy the low delay requirement in multiple consecutive evaluation periods, it may be determined that the consecutive data transmission does not satisfy the low delay requirement. By adopting the solution, scenarios in which the burst data transmission does not satisfy the low delay requirement can be excluded. By means of the embodiments, the purpose of improving the accuracy of determining whether the data transmission satisfies the low delay requirement may be achieved.

In some embodiments, the predetermined number is determined by determining transmission time M required by low delay data and notified to the AP by the second STA, and a duration T of a maximum TXOP of the AP; and rounding up a ratio of the transmission time M to the duration T to obtain the predetermined number. In the described embodiment, the predetermined number may be obtained by firstly determining the transmission time M required by the low delay data and notified to the AP by the second STA and the duration T of the maximum TXOP of the AP, and then rounding up the ratio of the transmission time M to the duration T. By means of the described embodiment, the purpose of determining the predetermined number may be achieved.

In some embodiments, the data transmission method further includes: the AP determines that the data transmission under the EDCA mode satisfies the low delay requirement, and switches from the enhanced HCCA mode to the EDCA mode, and performs the data transmission under the EDCA mode. In the above embodiment, the AP switches from the enhanced HCCA mode to the legacy EDCA mode on the condition that it is determined that the data transmission under the EDCA mode can satisfy the low delay requirement. In practical applications, when it is determined that both the uplink data transmission and the downlink data transmission under the EDCA mode satisfy the low delay requirement and it is determined that switching to the EDCA mode is possible, after the transmission under the current enhanced HCCA mode is completed and the CP stage is entered, the QoS CF-Poll frame is no longer invoked, so that the system enters the EDCA mode. With the above embodiments, the object of being able to switch from the enhanced HCCA mode to the EDCA mode may be achieved.

In some embodiments, the operation of determining that the data transmission under the EDCA mode satisfies the low delay requirement includes: the AP determines that uplink data transmission under the EDCA mode satisfies the low delay requirement, and determining, by the AP, that downlink data transmission under the EDCA mode satisfies the low delay requirement. In the foregoing embodiment, when the AP determines that both uplink data transmission and downlink data transmission under the legacy EDCA mode can satisfy the low delay requirement, it may be determined that data transmission under the EDCA mode can satisfy the low delay requirement. By means of the described embodiments, the purpose of determining whether the data transmission under the EDCA mode satisfies the low delay requirement may be achieved.

In some embodiments, the operation that the AP determines that the uplink data transmission under the EDCA mode satisfies the low delay requirement includes: the AP acquires a second Buffer Status Report (BSR) frame sent by a third STA included in all the STAs, and determines, when it is determined that the second BSR frame includes a target field and a value of the target field is equal to a second value, that the uplink data transmission under the EDCA mode satisfies the low delay requirement. In the described embodiment, the AP may acquire the second BSR frame sent by the STA, and determine whether uplink data transmission satisfies the low delay requirement according to whether the value of the target field included in the second BSR frame is equal to the second value, for example, the target field is newly added into the BSR control field, and when the value of the target field is 0 or 1 or another value, it is determined that the uplink data transmission satisfies the low delay requirement. In practical applications, it may be set that when the second value is 0, it is determined that the uplink data transmission can satisfy the low delay requirement, and when the second value is 1, it is determined that the uplink data transmission cannot satisfy the low delay requirement. By means of the described implementation, the purpose of determining whether uplink data transmission satisfies the low delay requirement according to the value of the target field newly added in the BSR frame may be achieved.

In some embodiments, the operation that the AP determines that the uplink data transmission under the EDCA mode satisfies the low delay requirement includes: the AP determines a maximum value among amounts of uplink transmission data successfully transmitted in multiple consecutive evaluation periods under the EDCA mode, and determining the maximum value as a first maximum value; and the AP determines that the uplink data transmission under the EDCA mode satisfies the low delay requirement when none of buffered uplink data amounts in the multiple consecutive evaluation periods under the enhanced HCCA mode is greater than the first maximum value. For example, the AP may record the maximum value among amounts of uplink transmission data successfully transmitted in multiple consecutive evaluation periods (e.g., 3, 5, or other number) under the EDCA mode, determine the maximum value as the first maximum value, and subsequently determine that the EDCA mode may support the transmission of the current buffered uplink data when the amount of buffered uplink data in the multiple consecutive evaluation periods (e.g., 3, 5, or other number) under the enhanced HCCA mode is not greater than the first maximum value. Through the foregoing implementation, the purpose of determining whether the EDCA mode may support the transmission of the buffered uplink data may be achieved.

In some embodiments, the operation that the AP determines that the downlink data transmission under the EDCA mode satisfies the low delay requirement includes: the AP determines a maximum value among amounts of downlink transmission data successfully transmitted in multiple consecutive evaluation periods under the EDCA mode, and determining the maximum value as a second maximum value; and the AP determines that the downlink data transmission under the EDCA mode satisfies the low delay requirement when none of buffered downlink data amounts in the multiple consecutive evaluation periods under the enhanced HCCA mode is greater than the second maximum value. For example, the AP may record the maximum value among amounts of downlink transmission data successfully transmitted in multiple consecutive evaluation periods (for example, 3 times, 5 times, or other number) under the EDCA mode, determine the maximum value as the second maximum value, and subsequently determine that the EDCA mode may support the transmission of the current buffered downlink data when the amount of buffered downlink data in the multiple consecutive evaluation periods (for example, 3 times, 5 times, or other number) under the enhanced HCCA mode is not greater than the second maximum value. Through the foregoing implementation, the purpose of determining whether the EDCA mode may support the transmission of the buffered downlink data may be achieved.

In some embodiments, the data transmission method further includes: after the AP enters the CP of the data transmission, when the AP acquires a second TXOP in the CP, the AP broadcasts the target frame to all the STAs, so as to notify all the STAs that the AP needs to occupy the second TXOP for data transmission. In the foregoing embodiment, after the AP enters the CP of the data transmission, if the AP acquires the second TXOP in the CP through contention, the AP broadcasts the target frame to all the STAs, so as to notify all the STAs that the AP needs to occupy the second TXOP for data transmission. In practical applications, in order to ensure the controllability of the delay of the multi-user transmission, the AP does not perform SU transmission during the CFP, and the AP may perform the SU transmission (realizing downward compatibility) if the AP acquires the TXOP during the CP.

Apparently, the embodiments described above are only a part rather than all of the embodiments of the present disclosure. The present disclosure will be described in detail with reference to exemplary embodiments.

Figure 4:
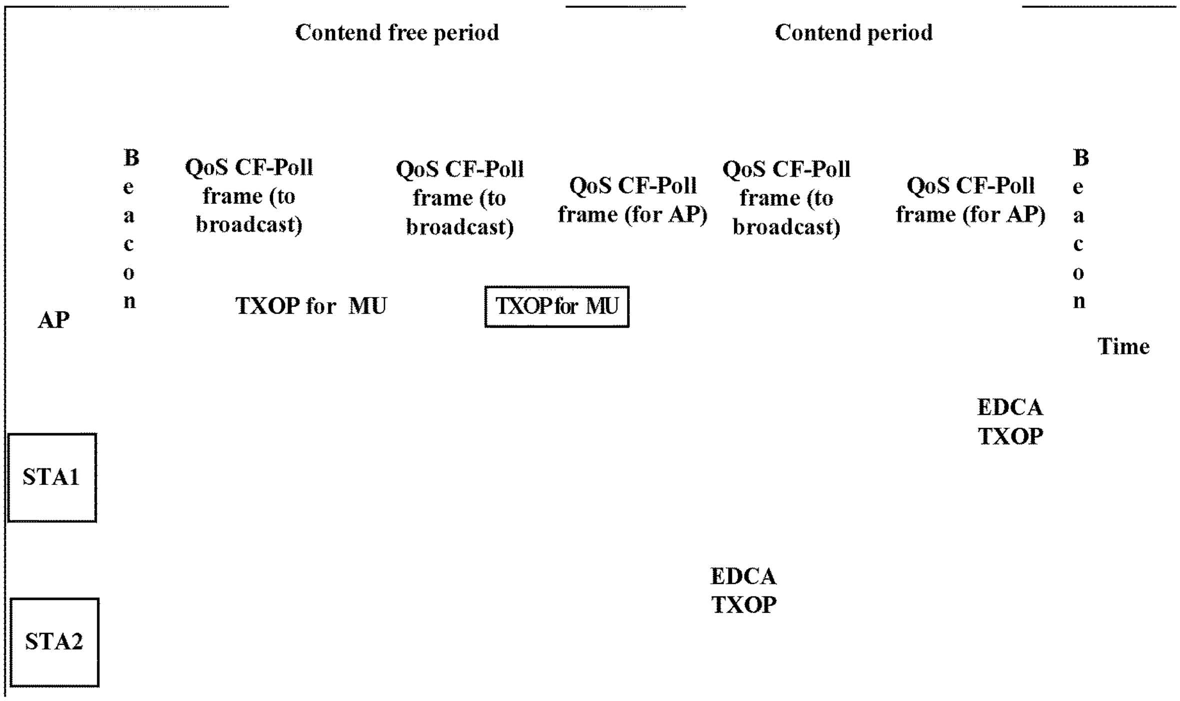
FIG. 4 is a schematic diagram of an enhanced HCCA mode according to an example of the present disclosure.

FIG. 4 is a schematic diagram of an enhanced HCCA mode according to an example of the present disclosure. As shown in FIG. 4, an enhanced HCCA mode is proposed by combining the HCCA mode controlling the function of scheduling TXOPs during a contend free period and multi-user transmission in an 802.11AX network. The enhanced HCCA mode mainly has the following four features.

1) During a contend free period, an AP notifies all STAs in a BSS via a modified QoS CF-Poll frame (corresponding to the described target frame) that the AP will occupy a TXOP for transmission, and after the TXOP ends, the AP may invoke the modified QoS CF-Poll frame again to realize multiple TXOP occupancies.
2) Within the TXOP occupied by the AP, the AP executes multi-user transmission supported by an 802.11AX network, including UL/DL MU-MIMO and UL/DL OFDMA.

3) In order to ensure the controllability of the delay of multi-user transmission, during the contend free period, the AP does not perform SU transmission; and during the CP, if the AP acquires a TXOP, the AP may perform SU transmission (downward compatibility).

4) Because the AP triggers multi-user transmission during the contend free period, the problem in a multi-user scenario (for example, in a multi-user transmission scenario in a dense and focused environment of the 802.11AX network, when there are too many users, the polling scheduling of all the STAs cannot be completed in one beacon period in the HCCA mode. As the number of users increases, the overhead of scheduling and processing of the users at the AP increases significantly) does not exist.

Hereinafter, the switching between the EDCA mode and the enhanced HCCA mode according to embodiments of the present disclosure will be described.

Exemplary Embodiment 1: Switching Procedure from EDCA Mode to Enhanced HCCA Mode Three aspects of low delay information collection, transmission status judgment criteria, and transmission status judgment mode are described as follows.

1) Low Delay Information Collection

In the uplink direction, an STA may notify, in an explicit manner, an AP of buffered low delay data information (transmission time M (for example, in milliseconds) required by the low delay data and a data size).

In the downlink direction, the AP buffers low delay data information to be transmitted to each STA in a transmission queue.

2) Low Delay Transmission Status Judgment Criteria

Criterion 1:

In the uplink direction, the amount of low delay transmission data that is completed by the STA when UL MU transmission (including UL-OFDMA and UL-MU MIMO) is triggered within a single TXOP is recorded, and when the total amount of uplink low delay transmission data completed by the STA in N consecutive TXOPs (corresponding to the described predetermined number of consecutive TXOPs) is less than the amount of the buffered low delay data reported to the AP for the first time, it is considered that the uplink transmission of the current STA does not satisfy the low delay requirement.

In the downlink direction, the total amount of downlink low delay transmission data in N consecutive TXOPs is recorded and compared with the amount of downlink low delay data buffered for the first time at the AP, and when the recorded total amount of downlink low delay transmission data is less than the amount of buffered data, it is considered that the current downlink transmission for the STA does not satisfy the low delay requirement.

It should be noted that, N=ceiling(M/Tmax), ceiling( ) represents a rounding up operation (Tmax is the maximum time of the TXOP of the AP, and in a complex user scenario, if low delay data transmission cannot be completed within N TXOP transmission intervals, it is considered that the low delay requirement is not satisfied), and N consecutive TXOPs form one evaluation period.

If neither the uplink nor downlink direction condition in Criterion 1 is met, it is determined that the transmission of the burst data fails to satisfy the low delay requirement.

Criterion 2:

A scenario where the burst data transmission does not satisfy the low delay requirement may exist when Criterion 1 is adopted, and in order to exclude this scenario, Criterion 2 is proposed as follows.

The amounts of uplink and downlink transmission data in the latest three evaluation periods (corresponding to the preceding multiple consecutive evaluation periods) are recorded according to Criterion 1, and whether the recorded total amount of downlink or uplink low delay transmission data is less than the amount of buffered data is judged according to Criterion 1. If the total amount of uplink or downlink transmission data is less than the amount of buffered data in three consecutive evaluation periods, it is determined that the consecutive data transmission does not satisfy the low delay requirement.

3) Transmission Status Judgment Mode

① Independent Judgment at AP

The AP evaluates the uplink and downlink data transmission according to Criterion 2.

② Integrated Judgment at Both AP and STA

In order to reduce overheads at the AP, the uplink data transmission is evaluated at the STA.

In the uplink direction, the STA evaluates the uplink data transmission according to Criterion 2, and when the requirement for consecutive low delay data transmission is not satisfied, the STA notifies the AP by adding a Request For Enhanced HCCA (RFEH) field to a BSR control field in a subsequent frame.

The RFEH (Request For Enhanced HCCA) field being set to 1 indicates that the STA judges that the consecutive uplink low delay data transmission does not satisfy the low delay requirement, and it is advised to switch to the enhanced HCCA mode; the RFEH field being set to 0 indicates that the STA judges that the consecutive uplink low delay data transmission satisfies the low delay requirement, and it is advised to switch to the EDCA mode. When the RFEH field does not exist, it indicates that the STA has no proposal.

Figure 5:
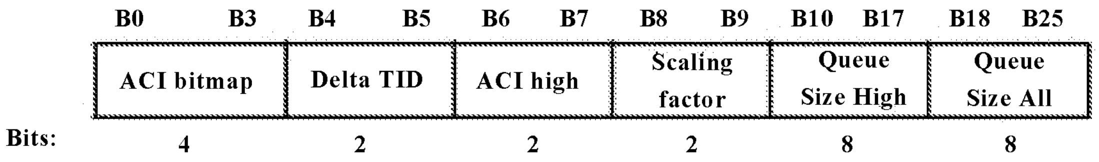
FIG. 5 is a schematic diagram of a format of a Buffer Status Reporting (BSR) control field according to the embodiments of the present disclosure.
Figure 6:
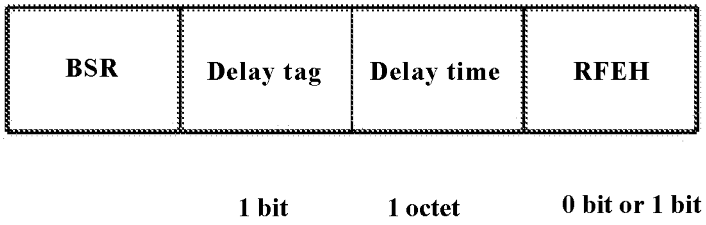
FIG. 6 is a schematic diagram of a format of a BSR control field according to the embodiments of the present disclosure.

FIG. 5 is a schematic diagram of a format of a Buffer Status Reporting (BSR) control field according to the embodiments of the present disclosure. As shown in FIG. 5, an 802.11AX network identifies different QoS access types through an ACI High field, and feeds back specific Buffer information through a Queue Size High field. An 802.11AX network terminal may further report buffer conditions of a plurality of QoS categories, and the buffer conditions are fed back through an ACI Bitmap field, a Delta TID field and a Queue Size All field in FIG. 5, wherein the ACI Bitmap field and the Delta TID field identify a plurality of QoS access types, the Queue Size All field identifies buffer conditions corresponding to the plurality of QoS access types, and a Scaling Factor field represents a scaling factor for indicating a unit size of the buffer. FIG. 6 is a schematic diagram of a format of a BSR control field according to the embodiments of the present disclosure. As shown in FIG. 6, when a delay tag field is set to 1, it indicates that buffered data is low delay data, and when the delay tag field is set to 0, it indicates the buffered data is not low delay data. A delay time field is a maximum transmission completion time, in milliseconds, of the buffered low delay data required by an STA. When the delay tag field is set to 0, the delay time field does not take effect.

In the downlink direction, the AP evaluates the downlink data transmission according to Criterion 2.

It should be noted that, however, the RFEH field and the buffer information described in the delay tag field and the delay time field are not necessarily associated, that is, the RFEH field indicates that the STA does not make a mode switching suggestion for the current buffer information, but makes a mode switching suggestion for the historical buffer information.

With the above embodiment, the channel access mode is switched from the EDCA mode to the enhanced HCCA mode when the low delay requirement for consecutive uplink or downlink data transmission is not satisfied.

Exemplary Embodiment 2: Switching Procedure from an Enhanced HCCA Mode to an EDCA Mode Two aspects of transmission status judgment criterion and transmission status judgment mode are described as follows.

1) Low Delay Transmission Status Judgment Criterion

Criterion 3

In the uplink direction, the amounts of uplink data successfully transmitted in the most recent three evaluation periods (corresponding to the described consecutive multiple evaluation periods) under the EDCA mode are recorded, the maximum value is determined as an uplink multi-user data threshold (UL MU threshold) (corresponding to the described first maximum value), and subsequently, when none of amounts of the buffered uplink data in the 3 consecutive evaluation periods under the enhanced HCCA mode is greater than the uplink multi-user data threshold (UL MU threshold), it is considered that the EDCA mode may support the transmission of the current buffered uplink data.

In the downlink direction, the amounts of downlink data successfully transmitted in the most recent three evaluation periods under the EDCA mode are recorded, and the maximum value is determined as the downlink multi-user data threshold (DL MU threshold), and subsequently, when none of the amounts of buffered downlink data in the consecutive three evaluation periods under the enhanced HCCA mode is not greater than the downlink multi-user data threshold (DL MU threshold) (corresponding to the described second maximum value), it is considered that the EDCA mode can support the transmission of the current buffered downlink data.

2) Transmission Status Judgment Mode

① Independent Judgment at AP

The AP evaluates the uplink and downlink data transmission according to Criterion 3.

② Integrated Judgment at Both AP and STA

The AP evaluates the downlink data transmission according to Criterion 3.

The STA evaluates the uplink data transmission according to Criterion 3, and the evaluation result is notified to the AP via the described RFEH field.

By means of the described embodiment, when it is judged that both the uplink data transmission and the downlink data transmission under the EDCA mode satisfy the low delay requirement, and it is determined that switching to the EDCA mode is able to be performed, after the transmission under the enhanced HCCA mode is completed and the CP stage is entered, the QoS CF-Poll frame is not invoked anymore, so that the system enters the EDCA mode.

It should be noted that the judgment criterion in the embodiments of the present disclosure is defaulted for all the STAs, that is, if there are n STA from STAT to STAn that have low delay data to be transmitted, and if at least one STA judges that the data transmission satisfies Criterion 2, the AP needs to switch to the enhanced HCCA mode. By the same reasoning, the AP may switch to the EDCA mode only if all the n STAs judge that the data transmission satisfies Criteria 3.

By means of the embodiments of the present disclosure, an improved QoS CF-Poll frame is introduced in an HCCA mode to enable an AP to consecutively acquire TXOP for multiple times for the multi-user transmission; in the channel access aspect, the AP controls scheduling so that requirements of low delay users on a transmission delay are guaranteed, and at the same time, the problem that when there are too many users in a multi-user transmission scenario, the polling scheduling of all the STAs cannot be completed in one beacon period under the HCCA mode, and as the number of users increases, the overhead of scheduling and processing of the users at the AP increases significantly is avoided.

Through the description of the foregoing embodiments, a person having ordinary skill in the art may clearly understand that the data transmission method according to the foregoing embodiments may be implemented in a manner of combining software and a universal hardware platform, and definitely may also be implemented only by hardware. However, in many cases, the former is a preferred implementation. Based on such an understanding, the essence of the technical solutions of the present disclosure or the part contributing to the related art may be implemented in the form of a software product. The computer software product may be stored in a storage medium (such as a Read-Only Memory (ROM)/Random Access Memory (RAM), a magnetic disk, or an optical disk), and includes several instructions for enabling a terminal device (which may be a mobile phone, a computer, a server, or a network device) to execute the data transmission method of the embodiments of the present disclosure.

The embodiments of the present disclosure also provide a data transmission apparatus. The data transmission apparatus may be provided in an AP. The data transmission apparatus is used for implementing the described embodiments and implementations, and what has been described will not be elaborated. The term "module", as used hereinafter, is a combination of software and/or hardware capable of realizing a predetermined function. Although the data transmission apparatus described in the following embodiment is preferably implemented by software, implementation of hardware or a combination of software and hardware is also conceivable.

Figure 7:
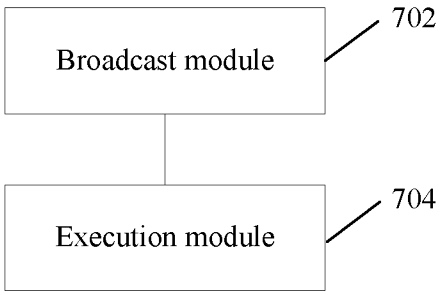
FIG. 7 is a structural block diagram of a data transmission apparatus according to the embodiments of the present disclosure.

FIG. 7 is a structural block diagram of a data transmission apparatus according to the embodiments of the present disclosure. The data transmission apparatus may be provided in an AP. As shown in FIG. 7, the data transmission apparatus includes a broadcast module 702 and an execution module 704.

The broadcast module 702 is configured to enter an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) included in a target Base Station Subsystem (BSS), so as to notify all the STAs that the AP needs to occupy a first Transmission Opportunity (TXOP) for data transmission.

The execution module 704 is configured to, after the first TXOP ends, in a case where it is determined that the AP has not completed the data transmission, control the AP to repeat the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, control the AP to enter a Contend Period (CP) of data transmission.

In some embodiments, the data transmission apparatus further includes: a first determination module, configured to, before the AP broadcasts the target frame to all the STAs included in the target BSS, determine that the data transmission under the EDCA mode does not satisfy the low delay requirement in a following manner: determining, by the AP, that uplink data transmission does not satisfy the low delay requirement, or determining, by the AP, that downlink data transmission does not satisfy the low delay requirement.

In some embodiments, the first determination module may determine that the uplink data transmission does not satisfy the low delay requirement in the following manner: acquiring, by the AP, a first Buffer Status Report (BSR) frame sent by a first STA included in all the STAs; and when it is determined that the first BSR frame includes a target field and a value of the target field is equal to a first value, determining, by the AP, that the uplink data transmission does not satisfy the low delay requirement.

In some embodiments, the first determination module may determine that the uplink data transmission does not satisfy the low delay requirement by performing the following operations in a single evaluation period: recording, by the AP, an amount of uplink low delay transmission data that is completed by a second STA included in all the STAs when Uplink Multi-User (UL MU) data transmission is triggered within each TXOP; and determining, by the AP, that the uplink data transmission does not satisfy the low delay requirement when a total amount of the uplink low delay transmission data that is completed by the second STA within a predetermined number of consecutive TXOPs is less than an amount of buffered low delay data reported by the second STA to the AP for the first time.

In some embodiments, the first determination module may determine that the uplink data transmission does not satisfy the low delay requirement in the following manner: determining, by the AP, that the uplink data transmission does not satisfy the low delay requirement when the AP determines that the uplink data transmission does not satisfy the low delay requirement in multiple consecutive evaluation periods.

In some embodiments, the first determination module may determine that the downlink data transmission does not satisfy the low delay requirement in a following manner: in a single evaluation period, recording, by the AP, an amount of downlink low delay transmission data that is completed by the AP when Downlink Multi-User (DL MU) data transmission is triggered within each TXOP; and determining, by the AP, that the downlink data transmission does not satisfy the low delay requirement when a total amount of the downlink low delay transmission data that is completed by the AP within a predetermined number of consecutive TXOPs is less than an amount of downlink low delay data buffered by the AP for the first time.

In some embodiments, the first determination module may determine that the downlink data transmission does not satisfy the low delay requirement in the following manner: determining, by the AP, that the downlink data transmission does not satisfy the low delay requirement when the AP determines that the downlink data transmission does not satisfy the low delay requirement in multiple consecutive evaluation periods.

In some embodiments, the predetermined number is determined by: determining transmission time M required by low delay data and notified to the AP by the second STA, and a duration T of a maximum TXOP of the AP; and rounding up a ratio of the transmission time M to the duration T to obtain the predetermined number.

In some embodiments, the data transmission apparatus further includes: a second determination module, configured to determine that the data transmission under the EDCA mode satisfies the low delay requirement; and a switching module, configured to switch from the enhanced HCCA mode to the EDCA mode, and perform the data transmission under the EDCA mode.

In some embodiments, the second determination module includes: a first determination unit configured to determine that uplink data transmission under the EDCA mode satisfies the low delay requirement; and a second determination unit configured to determine that downlink data transmission under the EDCA mode satisfies the low delay requirement.

In some embodiments, the first determination unit includes: a first acquisition subunit, configured to a second Buffer Status Report (BSR) frame sent by a third STA included in all the STAs; and a first determination subunit, configured to, when it is determined that the second BSR frame includes a target field and a value of the target field is equal to a second value, determine that the uplink data transmission under the EDCA mode satisfies the low delay requirement.

In some embodiments, the first determination unit includes: a second determination subunit configured to determine a maximum value among amounts of uplink transmission data successfully transmitted in multiple consecutive evaluation periods under the EDCA mode, and determining the maximum value as a first maximum value; and a third determination subunit configured to determine that the uplink data transmission under the EDCA mode satisfies the low delay requirement when none of buffered uplink data amounts in the multiple consecutive evaluation periods under the enhanced HCCA mode is greater than the first maximum value.

In some embodiments, the second determination unit includes: a fourth determination subunit configured to determine a maximum value among amounts of downlink transmission data successfully transmitted in multiple consecutive evaluation periods under the EDCA mode, and determining the maximum value as a second maximum value; and a fifth determination subunit configured to determine that the downlink data transmission under the EDCA mode satisfies the low delay requirement when none of buffered downlink data amounts in the multiple consecutive evaluation periods under the enhanced HCCA mode is greater than the second maximum value.

In some embodiments, the data transmission apparatus further includes: a processing module configured to, after the AP enters the CP of the data transmission, when the AP acquires a second TXOP in the CP, broadcast the target frame to all the STAs, so as to notify all the STAs that the AP needs to occupy the second TXOP for data transmission.

It should be noted that each module may be implemented by software or hardware. When implemented by hardware, each module may be implemented in, but not limited to, the following manner: all the modules are located in a same processor; or the modules are located in different processors in an arbitrary combination.

The embodiments of the present disclosure further provide a computer readable storage medium. The computer readable storage medium stores a computer program. The computer program, when being executed by a processor, causes the processor to implement operations in the foregoing data transmission method.

In some embodiments, the computer readable storage medium may include, but is not limited to, any medium that may store a computer program, such as a USB flash drive, a Read-Only Memory (ROM), a Random Access Memory (RAM), a removable hard disk, a magnetic disk, or an optical disc.

Figure 8:
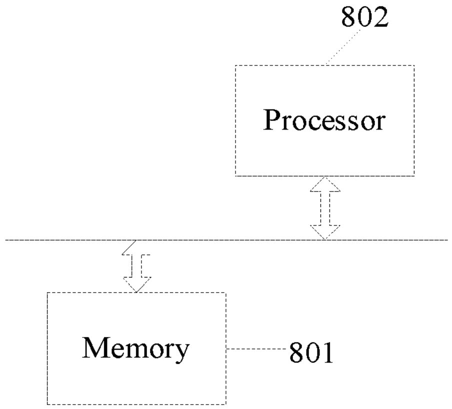
FIG. 8 is a schematic structural diagram of an electronic apparatus according to the embodiments of the present disclosure.

The embodiments of the present disclosure also provide an electronic apparatus. As shown in FIG. 8, the electronic apparatus includes a memory 801 and a processor 802. The memory 801 stores a computer program. The processor 802 executes the computer program to implement operations in the data transmission method.

In some implementations, the electronic apparatus may further include a transmission device and an input/output device, where the transmission device is connected to the processor 802, and the input/output device is connected to the processor 802.

For a specific example, reference may be made to the examples described in the foregoing embodiments and exemplary embodiments, and details are not repeatedly described herein.

A person having ordinary skill in the art should understand that each module or each operation of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices. In some cases, the operations shown or described in the present disclosure may be executed in a sequence different from that shown or described in the present disclosure, or may be made into each integrated circuit module respectively, or multiple modules or operations therein may be made into a single integrated circuit module for implementation. The present disclosure is not limited to any particular hardware and software combination.

The foregoing descriptions are merely some embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A data transmission method, comprising:

entering, by an Access Point (AP), an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) comprised in a target Base Station Subsystem (BSS), so as to notify all the STAs that the AP needs to occupy a first Transmission Opportunity (TXOP) for data transmission;

after the first TXOP ends, in a case where it is determined that the AP has not completed the data transmission, repeating, by the AP, the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, entering, by the AP, a Contend Period (CP) of data transmission, wherein before the AP broadcasts the target frame to all the STAs comprised in the target BSS, the data transmission method further comprises determining, by the AP, that the data transmission under the EDCA mode does not satisfy the low delay requirement in one of the following manners:

determining, by the AP, that uplink data transmission does not satisfy the low delay requirement, comprising performing the following operations in a single evaluation period: recording, by the AP, an amount of uplink low delay transmission data that is completed by a second STA comprised in all the STAs when Uplink Multi-User (UL MU) data transmission is triggered within each TXOP; and determining, by the AP, that the uplink data transmission does not satisfy the low delay requirement when a total amount of the uplink low delay transmission data that is completed by the second STA within a predetermined number of consecutive TXOPs is less than an amount of buffered low delay data reported by the second STA to the AP for the first time: or determining, by the AP, that downlink data transmission does not satisfy the low delay requirement, comprising performing the following operations in a single evaluation period: recording, by the AP, an amount of downlink low delay transmission data that is completed by the AP when Downlink Multi-User (DL MU) data transmission is triggered within each TXOP; and determining, by the AP, that the downlink data transmission does not satisfy the low delay requirement when a total amount of the downlink low delay transmission data that is completed by the AP within a predetermined number of consecutive TXOPs is less than an amount of downlink low delay data buffered by the AP for the first time.

2. The data transmission method according to claim 1, wherein determining, by the AP, that the uplink data transmission does not satisfy the low delay requirement comprises:

acquiring, by the AP, a first Buffer Status Report (BSR) frame sent by a first STA comprised in all the STAs; and when it is determined that the first BSR frame comprises a target field and a value of the target field is equal to a first value, determining, by the AP, that the uplink data transmission does not satisfy the low delay requirement.

3. The data transmission method according to claim 1, wherein determining, by the AP, that the uplink data transmission does not satisfy the low delay requirement comprises:

determining, by the AP, that the uplink data transmission does not satisfy the low delay requirement when the AP determines that the uplink data transmission does not satisfy the low delay requirement in multiple consecutive evaluation periods.

4. The data transmission method according to claim 1, wherein the predetermined number is determined in a following manner:

determining transmission time M required by low delay data and notified to the AP by the second STA, and a duration T of a maximum TXOP of the AP; and rounding up a ratio of the transmission time M to the duration T to obtain the predetermined number.

5. The data transmission method according to claim 4, wherein the predetermined number of consecutive TXOPs form one evaluation period.

6. The data transmission method according to claim 1, wherein determining, by the AP, that the downlink data transmission does not satisfy the low delay requirement comprises:

determining, by the AP, that the downlink data transmission does not satisfy the low delay requirement when the AP determines that the downlink data transmission does not satisfy the low delay requirement in multiple consecutive evaluation periods.

7. The data transmission method according to claim 1, wherein the predetermined number is determined in a following manner:

determining transmission time M required by low delay data and notified to the AP by the second STA, and a duration T of a maximum TXOP of the AP; and rounding up a ratio of the transmission time M to the duration T to obtain the predetermined number.

8. The data transmission method according to claim 7, wherein the predetermined number of consecutive TXOPs form one evaluation period.

9. The data transmission method according to claim 1, wherein determining, by the AP, that uplink data transmission does not satisfy the low delay requirement comprises:

receiving a notification from the STA sent when the STA determines that the uplink data transmission does not satisfy the low delay requirement; and determining, by the AP, that the uplink data transmission does not satisfy the low delay requirement according to notification received from the STA.

10. The data transmission method according to claim 1, further comprising:

determining that the data transmission under the EDCA mode satisfies the low delay requirement; and switching from the enhanced HCCA mode to the EDCA mode, and performing the data transmission under the EDCA mode.

11. The data transmission method according to claim 10, wherein determining that the data transmission under the EDCA mode satisfies the low delay requirement comprises:

determining that uplink data transmission under the EDCA mode satisfies the low delay requirement, and determining that downlink data transmission under the EDCA mode satisfies the low delay requirement.

12. The data transmission method according to claim 11, wherein determining, by the AP, that the uplink data transmission under the EDCA mode satisfies the low delay requirement comprises:

acquiring, by the AP, a second Buffer Status Report (BSR) frame sent by a third STA comprised in all the STAs; and when it is determined that the second BSR frame comprises a target field and a value of the target field is equal to a second value, determining that the uplink data transmission under the EDCA mode satisfies the low delay requirement.

13. The data transmission method according to claim 11, wherein determining, by the AP, that the uplink data transmission under the EDCA mode satisfies the low delay requirement comprises:

determining, by the AP, a maximum value among amounts of uplink transmission data successfully transmitted in multiple consecutive evaluation periods under the EDCA mode, and determining the maximum value as a first maximum value; and determining, by the AP, that the uplink data transmission under the EDCA mode satisfies the low delay requirement when none of buffered uplink data amounts in the multiple consecutive evaluation periods under the enhanced HCCA mode is greater than the first maximum value.

14. The data transmission method according to claim 11, wherein determining, by the AP, that the downlink data transmission under the EDCA mode satisfies the low delay requirement comprises:

determining, by the AP, a maximum value among amounts of downlink transmission data successfully transmitted in multiple consecutive evaluation periods under the EDCA mode, and determining the maximum value as a second maximum value; and determining, by the AP, that the downlink data transmission under the EDCA mode satisfies the low delay requirement when none of buffered downlink data amounts in the multiple consecutive evaluation periods under the enhanced HCCA mode is greater than the second maximum value.

15. The data transmission method according to claim 1, further comprising:

after entering, by the AP, the CP of the data transmission, when the AP acquires a second TXOP in the CP, broadcasting, by the AP, the target frame to all the STAs, so as to notify all the STAs that the AP needs to occupy the second TXOP for data transmission.

16. A non-transitory computer readable storage medium, wherein the computer readable storage medium stores a computer program, and the computer program, when being executed by a processor in an Access Point (AP), causes the processor to implement the following operations:

entering an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) comprised in a target Base Station Subsystem (BSS), so as to notify all the STAs that the AP needs to occupy a first Transmission Opportunity (TXOP) for data transmission;

after the first TXOP ends, in a case where it is determined that the AP has not completed the data transmission, repeating the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, entering a Contend Period (CP) of data transmission, wherein the computer program, when being executed by the processor in the AP, causes the processor to further implement the following operations before the AP broadcasts the target frame to all the STAs comprised in the target BSS: determining, by the AP, that the data transmission under the EDCA mode does not satisfy the low delay requirement in one of the following manners:

determining, by the AP, that uplink data transmission does not satisfy the low delay requirement, comprising performing the following operations in a single evaluation period: recording, by the AP, an amount of uplink low delay transmission data that is completed by a second STA comprised in all the STAs when Uplink Multi-User (UL MU) data transmission is triggered within each TXOP; and determining, by the AP, that the uplink data transmission does not satisfy the low delay requirement when a total amount of the uplink low delay transmission data that is completed by the second STA within a predetermined number of consecutive TXOPs is less than an amount of buffered low delay data reported by the second STA to the AP for the first time: or determining, by the AP, that downlink data transmission does not satisfy the low delay requirement, comprising performing the following operations in a single evaluation period: recording, by the AP, an amount of downlink low delay transmission data that is completed by the AP when Downlink Multi-User (DL MU) data transmission is triggered within each TXOP; and determining, by the AP, that the downlink data transmission does not satisfy the low delay requirement when a total amount of the downlink low delay transmission data that is completed by the AP within a predetermined number of consecutive TXOPs is less than an amount of downlink low delay data buffered by the AP for the first time.

17. An electronic apparatus provided in an Access Point (AP), comprising a memory and a processor, wherein the memory stores a computer program, and the processor is configured to execute the computer program to implement the following operations:

entering an enhanced Hybrid Coordination Function Controlled Channel Access (HCCA) mode when determining that data transmission under an Enhanced Distributed Channel Access (EDCA) mode does not satisfy a low delay requirement, wherein under the enhanced HCCA mode, the AP broadcasts a target frame to all Stations (STAs) comprised in a target Base Station Subsystem (BSS), so as to notify all the STAs that the AP needs to occupy a first Transmission Opportunity (TXOP) for data transmission;

after the first TXOP ends, in a case where it is determined that the AP has not completed the data transmission, repeating the operation of broadcasting the target frame to all the STAs so as to notify all the STAs that the AP needs to occupy other TXOP for the data transmission, until the AP completes the data transmission; and after the first TXOP ends, in a case where it is determined that the AP has completed the data transmission, entering a Contend Period (CP) of data transmission, wherein the processor is configured to execute the computer program to implement the following operations before the AP broadcasts the target frame to all the STAs comprised in the target BSS: determining, by the AP, that the data transmission under the EDCA mode does not satisfy the low delay requirement in one of the following manners:

determining, by the AP, that uplink data transmission does not satisfy the low delay requirement, comprising performing the following operations in a single evaluation period: recording, by the AP, an amount of uplink low delay transmission data that is completed by a second STA comprised in all the STAs when Uplink Multi-User (UL MU) data transmission is triggered within each TXOP; and determining, by the AP, that the uplink data transmission does not satisfy the low delay requirement when a total amount of the uplink low delay transmission data that is completed by the second STA within a predetermined number of consecutive TXOPs is less than an amount of buffered low delay data reported by the second STA to the AP for the first time; or determining, by the AP, that downlink data transmission does not satisfy the low delay requirement, comprising performing the following operations in a single evaluation period: recording, by the AP, an amount of downlink low delay transmission data that is completed by the AP when Downlink Multi-User (DL MU) data transmission is triggered within each TXOP; and determining, by the AP, that the downlink data transmission does not satisfy the low delay requirement when a total amount of the downlink low delay transmission data that is completed by the AP within a predetermined number of consecutive TXOPs is less than an amount of downlink low delay data buffered by the AP for the first time.

* * * * *